US008931254B2

(12) United States Patent
Ochi et al.

(10) Patent No.: US 8,931,254 B2
(45) Date of Patent: Jan. 13, 2015

(54) EXHAUST PIPE INJECTION CONTROL DEVICE

(75) Inventors: Naofumi Ochi, Fujisawa (JP); Shinji Hara, Fujisawa (JP); Kenzou Yaginuma, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 13/703,217

(22) PCT Filed: Jun. 10, 2011

(86) PCT No.: PCT/JP2011/063319
§ 371 (c)(1),
(2), (4) Date: Dec. 10, 2012

(87) PCT Pub. No.: WO2011/155584
PCT Pub. Date: Dec. 15, 2011

(65) Prior Publication Data
US 2013/0086892 A1 Apr. 11, 2013

(30) Foreign Application Priority Data

Jun. 11, 2010 (JP) ................................. 2010-134510

(51) Int. Cl.
*F02M 25/06* (2006.01)
*F01N 3/02* (2006.01)
(Continued)

(52) U.S. Cl.
CPC ............... *F02M 25/07* (2013.01); *F01N 9/002* (2013.01); *F02D 41/0055* (2013.01);
(Continued)

(58) Field of Classification Search
CPC ..... F01N 9/002; F01N 2610/03; F01N 3/021; F01N 3/0253; F01N 3/023; F02M 25/07; F02M 25/0718; F02M 25/072; F02M 25/0727; F02D 41/029; F02D 41/0055; F02D 2200/101
USPC ............ 60/278, 285, 286, 295, 297, 303, 311
See application file for complete search history.

(56) References Cited

U.S. PATENT DOCUMENTS 6,758,037 B2 * 7/2004 Terada et al. .................... 60/295

FOREIGN PATENT DOCUMENTS

| JP | 2005-42663 | 2/2005 |
| JP | 2008-303763 | 12/2008 |
| JP | 2010-59806 | 3/2010 |
| JP | 2010-059806 | * 3/2010 |
| JP | 2010-106691 | 5/2010 |

OTHER PUBLICATIONS

Written Opinion of the International Searching Authority mailed Jul. 5, 2011 in corresponding International Application No. PCT/JP2011/063319.

(Continued)

*Primary Examiner* — Thomas Denion
*Assistant Examiner* — Diem Tran
(74) *Attorney, Agent, or Firm* — Staas & Halsey LLP

(57) ABSTRACT

An exhaust pipe injection control device to optimally control a degree of exhaust gas recirculation ("EGR") opening during diesel particulate filter ("DPF") regeneration. The device includes a regeneration-time opening control unit which controls a degree of EGR opening of an EGR device during DPF regeneration, and a regeneration-time opening map in which an optimal degree of EGR opening of the EGR device during DPF regeneration is set in advance according to an engine rotation speed and a fuel injection amount of an engine. The regeneration-time opening control unit performs exhaust gas recirculation by referring to the regeneration-time opening map based on the engine rotation speed and the fuel injection amount of the engine and controlling the degree of EGR opening of the EGR device.

2 Claims, 4 Drawing Sheets

(51) Int. Cl.
*F01N 3/10* (2006.01)
*F01N 3/00* (2006.01)
*F02M 25/07* (2006.01)
*F01N 9/00* (2006.01)
*F02D 41/00* (2006.01)
*F02B 29/04* (2006.01)
*F02D 41/02* (2006.01)

(52) U.S. Cl.
CPC ...... *F02M 25/0711* (2013.01); *F02M 25/0718* (2013.01); *F02B 29/0406* (2013.01); *F02D 41/029* (2013.01); *F02D 2200/0614* (2013.01); *F02D 2200/101* (2013.01); *F02M 25/0727* (2013.01); *Y02T 10/47* (2013.01)
USPC .................. 60/278; 60/286; 60/295; 60/297; 60/303; 60/311

(56) References Cited

OTHER PUBLICATIONS

Patent Abstracts of Japan, Publication No. 2005-042663, Published Feb. 17, 2005.
Patent Abstracts of Japan, Publication No. 2008-303763, Published Dec. 18, 2008.
Patent Abstracts of Japan, Publication No. 2010-059806, Published Mar. 18, 2010.
Patent Abstracts of Japan, Publication No. 2010-106691, Published May 13, 2010.
International Search Report of PCT/JP2011/063319 mailed Jul. 5, 2011.

* cited by examiner

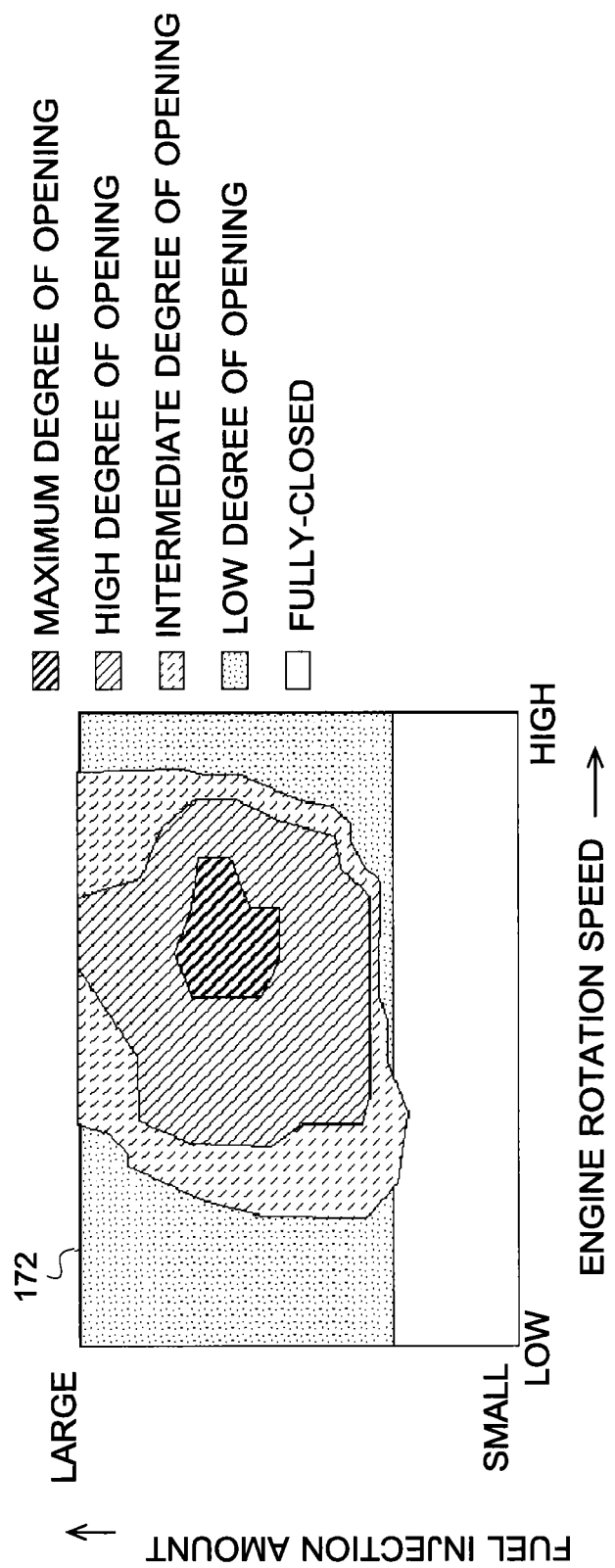

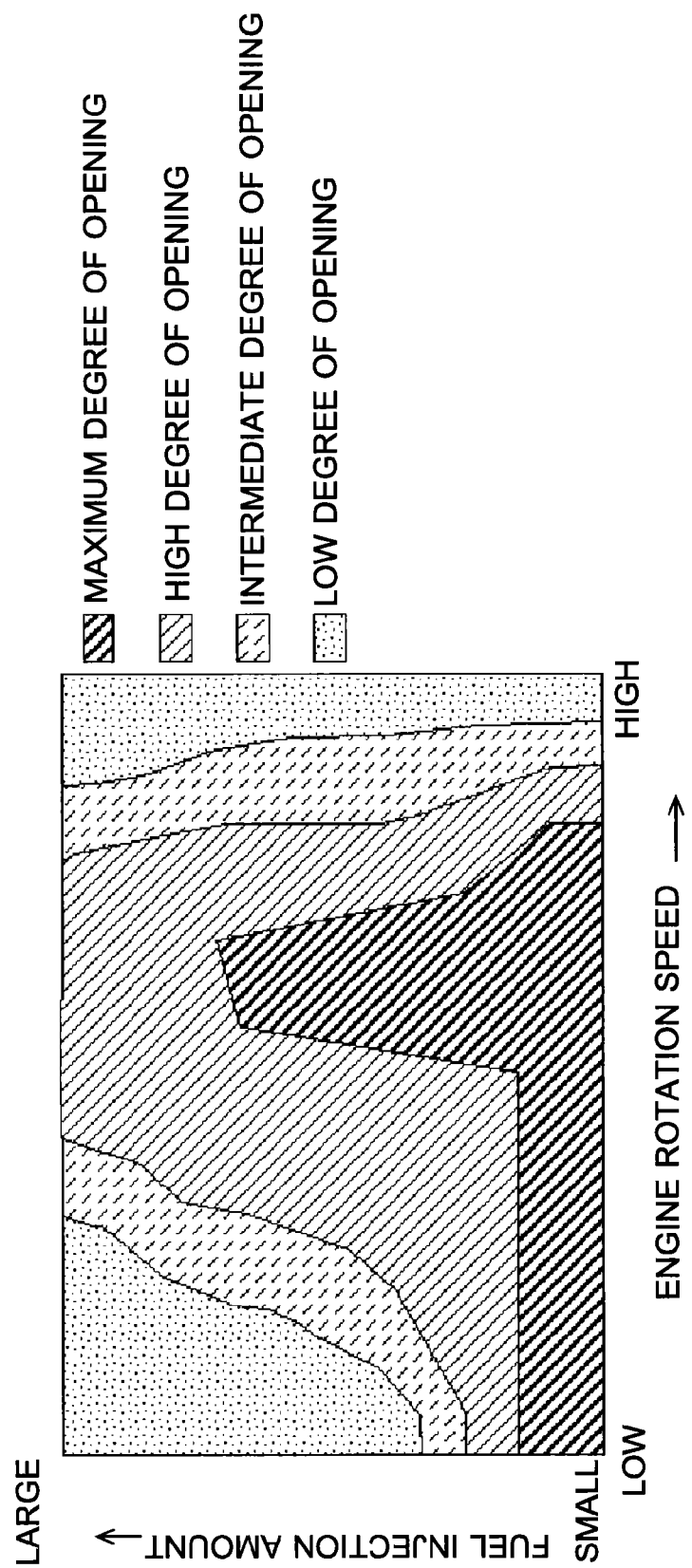

EXHAUST PIPE INJECTION CONTROL DEVICE

CROSS-REFERENCE TO RELATED APPLICATIONS

This application claims the foreign priority benefit of Japanese herein by reference, which serves as priority for PCT Application No. JP2011/063319 Jun. 10, 2011.

TECHNICAL FIELD

The present invention relates to an exhaust pipe injection control device that injects fuel for diesel particulate filter (DPF) regeneration into an exhaust pipe and, in particular, to an exhaust pipe injection control device capable of optimally controlling a degree of exhaust gas recirculation (EGR) opening during DPF regeneration.

BACKGROUND ART

In a diesel engine, an exhaust pipe is provided with a DPF in order to remove particulate matter (hereinafter referred to as PM) from exhaust gas from the diesel engine to purify the exhaust gas. A DPF is designed to collect PM in a honeycomb structure constituted by a porous ceramic. While excessive accumulation of collected PM impedes circulation of exhaust gas, the PM accumulated in the DPF can be removed through incineration by raising exhaust gas temperature. This is known as DPF regeneration.

Conventionally, in multistage injection in which an oxidation catalyst (hereinafter referred to as a DOC) made of platinum or the like is installed upstream of the DPF and fuel injection is performed in multiple stages in order to obtain engine thrust, methods of raising exhaust gas temperature to a level where PM can be incinerated include a method involving raising exhaust gas temperature to DOC activation temperature by increasing fuel injection amount, performing fuel injection for DPF regeneration (post-injection) at an appropriate subsequent crank angle, supplying hydrocarbon (hereinafter referred to as HC) to the DOC by the post-injection, and raising the exhaust gas temperature to PM incineration temperature using heat produced by oxidation of the HC.

However, performing post-injection causes oil dilution in which the injected fuel becomes mixed into an engine lubricant and dilutes the lubricant. In addition, mixing of unburnt fuel of the post-injection into an EGR device causes a decline in performance of an EGR cooler or a failure of a piston ring.

Therefore, conventionally, EGR control is suspended by fully closing an EGR valve during DPF regeneration when post-injection is performed.

PRIOR ART DOCUMENTS

Patent Document 1: Japanese Patent Application Publication No. 2010-106691

As described above, conventionally, EGR is suspended during DPF regeneration. However, suspending EGR control increases an amount of nitrogen oxides (NOx) in exhaust gas.

In contrast thereto, the present inventors are evaluating a method of performing exhaust pipe injection in which fuel is injected downstream of an EGR piping connecting portion of the exhaust pipe into the exhaust pipe in order to supply HC to the DOC and raising exhaust gas temperature using heat produced by oxidation of the HC. According to this method, since fuel is injected into the exhaust pipe instead of the engine, oil dilution no longer occurs. In addition, since the fuel is injected downstream of the EGR piping connecting portion, the fuel does not contaminate the EGR device. Based on these findings, the present inventors propose performing EGR control during DPF regeneration by exhaust pipe injection.

Meanwhile, with an EGR device, a degree of EGR opening is adjusted according to engine condition. A degree of EGR opening is a degree of opening of an EGR valve provided on an EGR piping, and increasing the degree of EGR opening increases an amount of exhaust gas circulated to the engine and reducing the degree of EGR opening reduces the amount of exhaust gas circulated to the engine. An EGR map is provided so as to enable adjusting of the degree of EGR opening according to engine condition.

An EGR map is a map in which a degree of EGR opening is set according to an engine rotation speed and a fuel injection amount of the engine, whereby a degree of EGR opening can be controlled by referring to the EGR map based on an engine rotation speed and a fuel injection amount of the engine. The degree of EGR opening set in the EGR map is an optimal value at which the exhaust gas is or almost comprehensively cleanest with respect to NOx, PM, and the like. Alternatively, an optimal value may be adopted which takes into consideration a production of greater output torque or a reduction in gas mileage in addition to such exhaust gas performance. An optimal value of the degree of EGR opening that is set in the EGR map is obtained from results of numerous experiments conducted in order to measure exhaust gas while driving the engine under various engine conditions.

With conventional post-injection, EGR control is suspended during DPF regeneration. In contrast, with the exhaust pipe injection proposed by the present inventors, conventional art cannot be utilized because EGR control is performed during DPF regeneration. Therefore, novel means capable of optimally controlling the degree of EGR opening during DPF regeneration is required.

SUMMARY OF THE INVENTION

In this light, an object of the present invention is to solve the problems described above by providing an exhaust pipe injection control device capable of optimally controlling a degree of EGR opening during DPF regeneration.

In order to achieve the object described above, the present invention includes: a diesel particulate filter which is installed in an exhaust pipe of an engine and which collects particulate matter; an exhaust gas recirculation device which circulates exhaust gas from an exhaust manifold to an intake manifold of the engine according to a degree of opening; an exhaust pipe injector which is installed upstream of the diesel particulate filter in the exhaust pipe and downstream of the exhaust gas recirculation device, and which injects fuel into the exhaust pipe during regeneration of the diesel particulate filter; and a regeneration-time opening control unit which controls the degree of opening of the exhaust gas recirculation device during the regeneration to perform exhaust gas recirculation.

A regeneration-time opening map may be provided in which a degree of opening of the exhaust gas recirculation device during the regeneration is set in advance according to an engine rotation speed and a fuel injection amount of the engine, and the regeneration-time opening control unit may control the degree of opening of the exhaust gas recirculation device by referring to the regeneration-time opening map based on the engine rotation speed and the fuel injection amount of the engine.

The regeneration-time opening map may have a region in which the degree of opening is set to fully-closed.

The present invention produces the superior advantageous effect below.

A degree of EGR opening during DPF regeneration can be optimally controlled.

BRIEF DESCRIPTION OF THE DRAWINGS

FIG. 3 is a diagram of a regeneration-time EGR opening map used during DPF regeneration according to the present invention.

FIG. 4 is a diagram of a basic EGR opening map used during non-DPF regeneration according to the present invention.

DETAILED DESCRIPTION

Hereinafter, an embodiment of the present invention will be described in detail with reference to the accompanying drawings.

Figure 1:
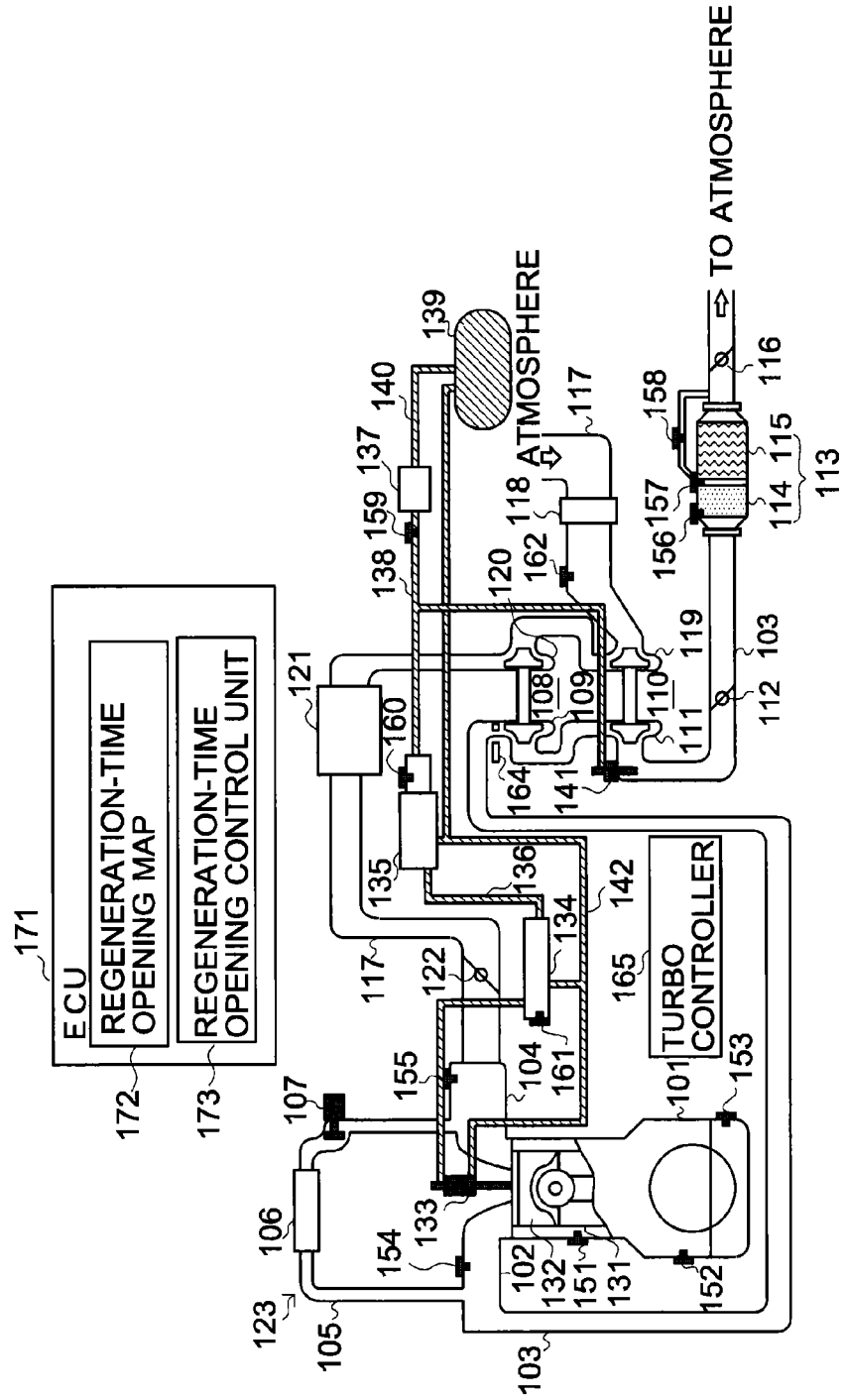
FIG. 1 is a system configuration diagram of an engine, an intake and exhaust system, and a fuel injection system of a vehicle to which the exhaust pipe injection control device according to the present invention is applied.

FIG. 1 shows a system configuration of an engine, an intake and exhaust system, and a fuel injection system of a vehicle to which the exhaust pipe injection control device according to the present invention is applied.

First, to describe a configuration of an exhaust system, an exhaust pipe 103 for discharging exhaust gas from an engine 101 to atmosphere is connected to an exhaust manifold 102 of the engine 101, and an EGR piping 105 for circulating exhaust gas from the exhaust manifold 102 to an intake manifold 104 is provided most upstream in the exhaust pipe 103. The EGR piping 105 is provided with an EGR cooler 106 for cooling exhaust gas and an EGR valve 107 for adjusting an EGR volume (or an EGR rate). The EGR piping 105, the EGR cooler 106, and the EGR valve 107 will collectively be referred to as an EGR device 123.

A turbine 109 of a high-pressure stage turbocharger 108 is provided downstream of the exhaust pipe 103 and a turbine 111 of a low-pressure stage turbocharger 110 is provided further downstream. An exhaust brake valve 112 which closes the exhaust pipe 103 is provided downstream of the turbine 111, and a DPF unit 113 is provided further downstream. The DPF unit 113 is constituted by a DOC 114 which promotes oxidation of fuel injected into the exhaust pipe 103 during DPF regeneration and a DPF 115 which collects PM. An exhaust throttle 116 is provided downstream of the DPF unit 113 and the exhaust pipe 103 is opened downstream of the exhaust throttle 116 to atmosphere. Moreover, although not shown, the exhaust pipe 103 may be provided with an SCR (selective catalytic reduction) device.

Next, to describe a configuration of an intake system, an intake pipe 117 for taking air into the engine 101 from atmosphere is connected to the intake manifold 104. Most upstream of the intake pipe 117 is open to atmosphere, and an air cleaner 118 for removing foreign objects such as dust is provided downstream of the intake pipe 117. A compressor 119 of the low-pressure stage turbocharger 110 is provided downstream of the air cleaner 118 and a compressor 120 of the high-pressure stage turbocharger 108 is provided further downstream. An intercooler 121 for cooling intake air compressed by the low-pressure stage turbocharger 110 and the high-pressure stage turbocharger 108 is provided downstream of the compressor 120, and an intake throttle (ITH) 122 for limiting intake volume is provided further downstream. The intake pipe 117 is connected downstream of the intake throttle 122 to the intake manifold 104.

Next, to describe a configuration of a fuel injection system, the fuel injection system is configured so that a piston head 132 performs a reciprocating motion inside a cylinder 131 shown by a partial fracture cross-section of the engine 101. An injector 133 for injecting fuel is attached to the cylinder 131 and an injection port of the injector 133 is arranged at a position above a top dead center position of the piston head 132. While a simple diagram is shown, the engine 101 includes a plurality of cylinders 131 and each cylinder 131 is provided with the injector 133. Each injector 133 is supplied with high-pressure fuel from a common rail 134. Although details will not be shown, the injector 133 has a valving element that is driven by an electromagnetic force of a coil, and the injection port is opened according to a duration (application time) of a pulse current applied to the coil.

A high-pressure fuel pipe 136 which supplies fuel at a high-pressure (common rail fuel pressure) from a high-pressure pump 135 is connected to the common rail 134. An intermediate-pressure fuel pipe 138 which supplies fuel from a feed pump 137 at an intermediate pressure (exhaust pipe injection fuel pressure) that is lower than the common rail fuel pressure and higher than atmospheric pressure is connected to the high-pressure pump 135. The feed pump 137 is adapted to take in fuel from a fuel tank 139 at atmospheric pressure via a low-pressure fuel pipe 140. The feed pump 137 is coupled to a crankshaft (not shown) and is rotated so as to accompany the engine 101, and by pumping out fuel with a pump-out force in accordance with an engine rotation speed, the feed pump 137 is able to supply fuel at an exhaust pipe injection fuel pressure in accordance with the engine rotation speed to the intermediate-pressure fuel pipe 138.

In the present invention, an exhaust pipe injector 141 for injecting fuel into the exhaust pipe 103 is provided downstream of the turbine 111 of the low-pressure stage turbocharger 110 and upstream of the exhaust brake valve 112. The exhaust pipe injector 141 is adapted so that fuel is supplied to the exhaust pipe injector 141 from the feed pump 137 via the intermediate-pressure fuel pipe 138.

A recovered fuel pipe 142 which recovers surplus fuel to the fuel tank 139 is respectively connected to the high-pressure pump 135, the common rail 134, and the injector 133.

Next, sensors will be described.

The engine 101 is provided with a water temperature sensor 151 which detects cooling water temperature, a crank angle sensor 152 which detects an index on the crankshaft (not shown) as a crank angle reference position, an oil level sensor 153 which detects a remaining level of engine oil, and the like. An engine exhaust temperature sensor 154 is provided on the exhaust manifold 102. A boost pressure sensor 155 is provided on the intake manifold 104.

The DPF unit 113 is provided with a DOC entrance exhaust gas temperature sensor 156 which detects an exhaust gas temperature at an entrance of the DOC 114, a DPF entrance exhaust gas temperature sensor 157 which detects an exhaust gas temperature at an entrance of the DPF 115, and a differential pressure sensor 158 which detects a differential pressure that is a difference in exhaust gas pressure between the entrance and an exit of the DPF 115. As PM accumulates in the DPF 115, the differential pressure increases with an increase in accumulation. Therefore, a timing of DPF regeneration can be judged based on the differential pressure. A temperature of the DPF 115 during DPF regeneration and the like can be checked by a DPF entrance exhaust gas temperature detected by the DPF entrance exhaust gas temperature sensor 157.

The intermediate-pressure fuel pipe 138 is provided with an exhaust pipe injection fuel pressure sensor 159 which detects an exhaust pipe injection fuel pressure that is fuel pressure that acts on the exhaust pipe injector 141. A fuel temperature sensor 160, which detects fuel temperature, is provided at an entrance of the high-pressure pump 135. The common rail 134 is provided with a common rail fuel pressure sensor 161 which detects a common rail fuel pressure that is fuel pressure that acts on the injector 133 of each cylinder 131. A mass air flow sensor (MAF sensor) 162 which detects a flow of air taken in by the intake pipe 117 is provided downstream of the air cleaner 118 of the intake pipe 117.

It is assumed that the engine 101, the intake and exhaust system, and the fuel injection system are provided with every conventionally-known sensor in addition to those illustrated and described.

Next, a configuration of a control system will be described.

The high-pressure stage turbocharger 108 is a variable nozzle turbocharger. A nozzle actuator 164 which adjusts an opening area of the turbine 109 is provided upstream of the turbine 109. A turbo controller 165 controls a supercharging volume or a supercharging pressure by referring to a boost pressure detected by the boost pressure sensor 155 and driving the nozzle actuator 164.

Control for respective sections of a vehicle including fuel injection to the engine 101 is built into an electronic control unit (ECU) 171 in the form of a program. The ECU 171 is adapted to control fuel injection and the like by constantly detecting engine rotation speed, accelerator position, load torque, air volume, and the like as engine parameters which indicate engine condition. In order to obtain thrust of the engine 101, the ECU 171 is adapted to execute multistage injection control in which fuel injection is performed a plurality of times from the injector 133 at an appropriate crank angle within one combustion cycle of each cylinder 131. The ECU 171 is adapted to control a degree of EGR opening of the EGR device 123. A degree of EGR opening is a degree of opening of the EGR valve 107 through which an EGR volume is adjusted.

Furthermore, the ECU 171 is adapted to perform DPF regeneration each time a travel distance of the vehicle reaches a predetermined distance and to perform DPF regeneration when a differential pressure detected by the differential pressure sensor 158 equals or exceeds a predetermined value. During DPF regeneration, the ECU 171 sets a target injection amount of a single injection from the exhaust pipe injector 141 according to an engine rotation speed and an exhaust gas flow rate, and controls the exhaust pipe injector 141 in accordance with the target injection amount.

The ECU 171 according to the present invention is provided with: a regeneration-time opening map 172 in which an optimal degree of EGR opening of the EGR device 123 during DPF regeneration is set in advance according to an engine rotation speed and a fuel injection amount of the engine 101; and a regeneration-time opening control unit 173 which performs exhaust gas recirculation by referring to the regeneration-time opening map 172 during DPF regeneration based on the engine rotation speed and the fuel injection amount of the engine 101 and controlling the degree of EGR opening of the EGR device 123.

Moreover, during non-DPF regeneration, the ECU 171 controls the degree of EGR opening using a basic EGR opening map as is conventionally used.

Figure 2:
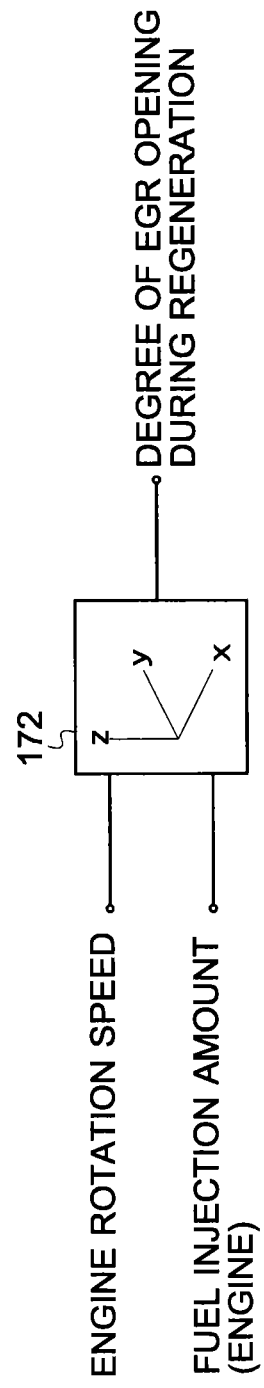
FIG. 2 is a diagram showing a circuit image representation of controlling a degree of EGR opening during DPF regeneration according to the present invention.

As shown in FIG. 2, to represent means for control of the degree of EGR opening during DPF regeneration in the ECU 171 by a circuit image, an engine rotation speed and a fuel injection amount of the engine are inputted to the regeneration-time opening map 172 and a regeneration-time EGR opening is outputted from the regeneration-time opening map 172.

As shown in FIG. 3, the regeneration-time opening map 172 can be approximately represented by a contour graph of a degree of EGR opening with engine rotation speed on an abscissa thereof and a fuel injection amount of the engine 101 on an ordinate thereof. Dark hatching indicates a maximum degree of opening and the lighter the hatching, the smaller the degree of opening. According to the regeneration-time opening map 172, a region with a maximum degree of EGR opening exists where the engine rotation speed is slightly higher than an intermediate level (slightly right of center in a horizontal direction of the graph) and where the fuel injection amount of the engine 101 is slightly larger than an intermediate level (slightly above center in a vertical direction of the graph). Regions with high and intermediate degrees of EGR opening are located around the region with the maximum degree of EGR opening, and regions with low degrees of EGR opening are further located on a low engine rotation speed-side and a high engine rotation speed-side of the regions with high and intermediate degrees of opening. In these regions, a degree of EGR opening is set which optimizes an exhaust gas performance with respect to NOx, PM, and the like, an output torque performance, and gas mileage that have been obtained based on experiments. In addition, regions where the fuel injection amount of the engine 101 is a small amount are regions where EGR is fully closed and where the engine rotation speed ranges from minimum to maximum. In other words, when the fuel injection amount of the engine 101 is equal to or under a predetermined value, EGR is fully closed regardless of engine rotation speeds. This region is provided in order to protect the EGR cooler 106, prevent an HC slip in which HC is discharged into atmosphere from the exhaust pipe 103, and prevent white smoke.

Hereinafter, operations of the exhaust pipe injection control device according to the present invention will be described.

During DPF regeneration, the ECU 171 raises exhaust gas temperature to an activation temperature of the DOC 114 by increasing a fuel injection amount from the injector 133 in multistage injection of the engine 101, supplies HC to the DOC 114 by injecting fuel into the exhaust pipe 103 from the exhaust pipe injector 141 at a subsequent appropriate injection timing, and raises the exhaust gas temperature to an incineration temperature of the PM using heat produced by oxidation of the HC. In addition, in order to raise exhaust gas temperature to a desired temperature, the ECU 171 executes exhaust pipe injection by setting the target injection amount of a single injection from the exhaust pipe injector 141 according to an engine rotation speed and an exhaust gas flow rate.

During DPF regeneration in which exhaust pipe injection is performed in this manner, the regeneration-time opening control unit 173 refers to the regeneration-time opening map 172 based on the engine rotation speed and the fuel injection amount of the engine 101 and controls the degree of EGR opening of the EGR device 123. As a result, EGR control during DPF regeneration is performed according to the regeneration-time opening map 172 shown in FIG. 3. Therefore, even during DPF regeneration, the degree of EGR opening is optimally controlled and, for example, NOx in exhaust gas is reduced.

Conventional EGR control during non-DPF regeneration and EGR control during DPF regeneration according to the present invention will now be compared with each other.

FIG. 4 is a basic EGR opening map that is used during non-DPF regeneration. According to this basic EGR opening map, regions with a maximum degree of EGR opening exist where an engine rotation speed ranges from lowest to slightly higher than an intermediate level when a fuel injection amount of the engine 101 is a small amount and where the fuel injection amount of the engine 101 ranges from lowest to slightly high (slightly above center in a vertical direction of the graph) when the engine rotation speed is slightly higher than an intermediate level (slightly right of center in a horizontal direction of the graph). Around these regions, the degree of EGR opening varies from high to intermediate to low as the engine rotation speed decreases when the fuel injection amount of the engine 101 is large amount, and varies from high to intermediate to low as the engine rotation speed increases when the engine rotation speed is high.

As shown, in the basic EGR opening map, the degree of EGR opening is increased when a fuel injection amount of the engine 101 is a small amount. In contrast, in the regeneration-time opening map 172, the degree of EGR opening is set to fully-closed when the fuel injection amount of the engine 101 is equal to or under a predetermined value regardless of engine rotation speeds. This is done in consideration of the fact that HC is abundant in exhaust gas from the engine 101 when the fuel injection amount of the engine 101 is a small amount in order to protect the EGR cooler 106 by preventing HC from entering the EGR cooler 106. In addition, by setting the degree of EGR opening to fully-closed, an advantageous effect of reducing HC in the exhaust gas from the engine 101 and preventing an HC slip and white smoke can be obtained.

Moreover, while the two EGR opening maps shown in FIGS. 3 and 4 present degrees of EGR opening in four levels including maximum, high, intermediate, low, and fully-closed, degrees of EGR opening are favorably presented in a greater number of levels.

As described above, since the exhaust pipe injection control device according to the present invention includes: a regeneration-time opening map 172 in which an optimal degree of EGR opening of the EGR device 123 during DPF regeneration is set in advance according to an engine rotation speed and a fuel injection amount of the engine 101; and a regeneration-time opening control unit 173 which performs exhaust gas recirculation by referring to the regeneration-time opening map 172 during DPF regeneration based on the engine rotation speed and the fuel injection amount of the engine 101 and controlling the degree of EGR opening of the EGR device 123, the degree of EGR opening can be optimally controlled even during DPF regeneration.

With the exhaust pipe injection control device according to the present invention, since the regeneration-time opening map 172 has a region where the degree of opening is set to fully-closed, for example, an advantageous effect of protecting the EGR cooler 106 and preventing an HC slip and white smoke can be obtained by setting the degree of EGR opening to fully-closed when a fuel injection amount of the engine 101 is a small amount.

The invention claimed is:

1. An exhaust pipe injection control device comprising:
   a filter which is installed in an exhaust pipe of an engine and which collects particulate matter;
   an exhaust gas recirculation device which circulates exhaust gas from an exhaust manifold to an intake manifold of the engine according to a degree of opening of the exhaust gas recirculation device;
   an exhaust pipe injector which is installed upstream of the filter in the exhaust pipe and downstream of the exhaust gas recirculation device, and which injects an amount of fuel into the exhaust pipe during regeneration of the filter; and
   a controller which controls the degree of opening of the exhaust gas recirculation device during the filter regeneration to perform exhaust gas recirculation,
   wherein the controller controls the degree of opening of the exhaust gas recirculation device by referring to an engine rotation speed and a fuel injection amount of the engine, and the degree of opening of the exhaust gas recirculation device is fully closed when the fuel injection amount of the engine is equal to or under a predetermined value.

2. The exhaust pipe injection control device according to claim 1,
   wherein the degree of opening of the exhaust gas recirculation device is maximally opened when the fuel injection amount of the engine is equal to or under a predetermined value during non regeneration of the filter.

* * * * *